FIG. I

INVENTOR,
TORSTEN RAMÉN

INVENTOR.
TORSTEN RAMÉN

United States Patent Office 3,093,553
Patented June 11, 1963

3,093,553
PROCESSES OF EVAPORATING ALCOHOLIC LIQUORS
Torsten Ramén, Drottninggatan 71 C, Stockholm, Sweden
Filed Nov. 13, 1959, Ser. No. 852,665
5 Claims. (Cl. 202—43)

The present invention relates to a method of evaporating alcoholic liquids, e.g. fermented sulfite waste liquor, with simultaneous recovery of the alcohol contained therein. The main object of this invention is to improve the heat economy of the evaporation process and to enable the production of a highly concentrated alcohol directly in the evaporating plant and thereby eliminate the conventional rectification apparatus.

This and other objects are achieved in accordance with this invention by introducing the alcoholic liquid into the evaporating stage operating at the lowest temperature of the evaporation process and distilling off all or the major portion of the alcohol in said stage, condensing the alcoholic vapours thus formed to form an alcoholic condensate and distilling off the alcohol from said alcoholic condensate by introducing it into a column where it is distilled off by the aid of uncondensed gases and vapours withdrawn from the steam side of a heater belonging to an evaporating stage operating at the same or higher temperature.

Figure 1:
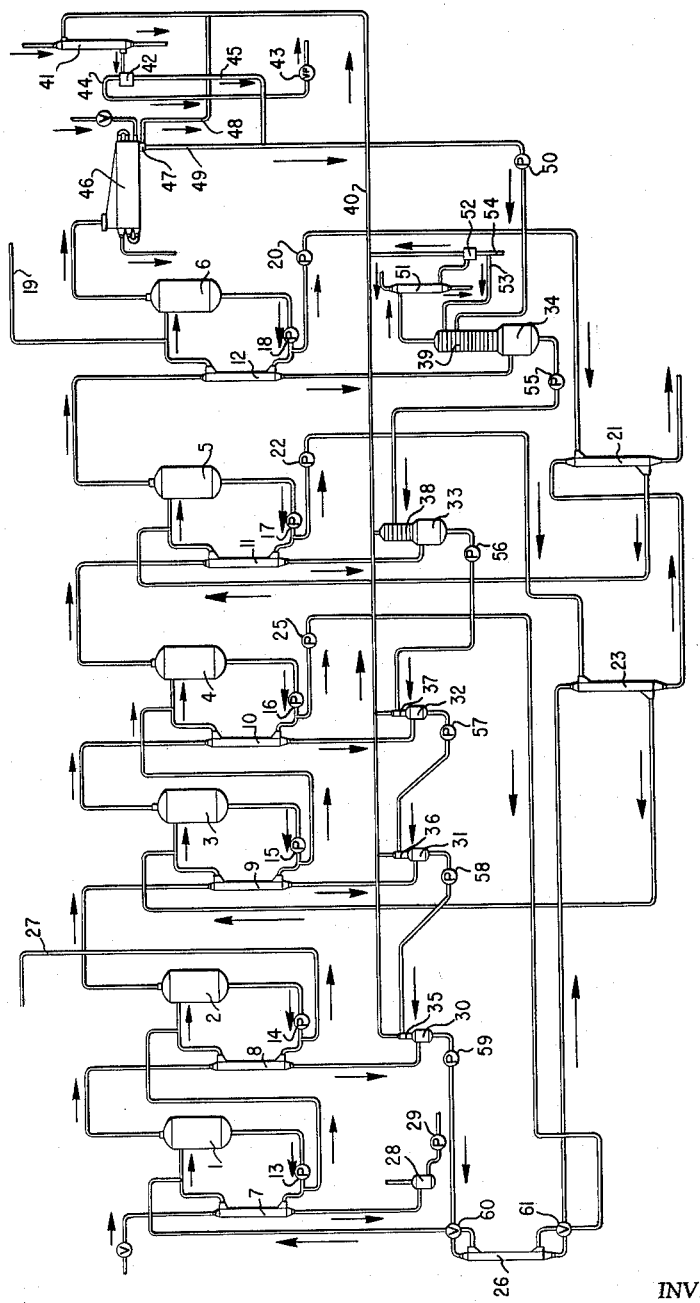
Figure 2:
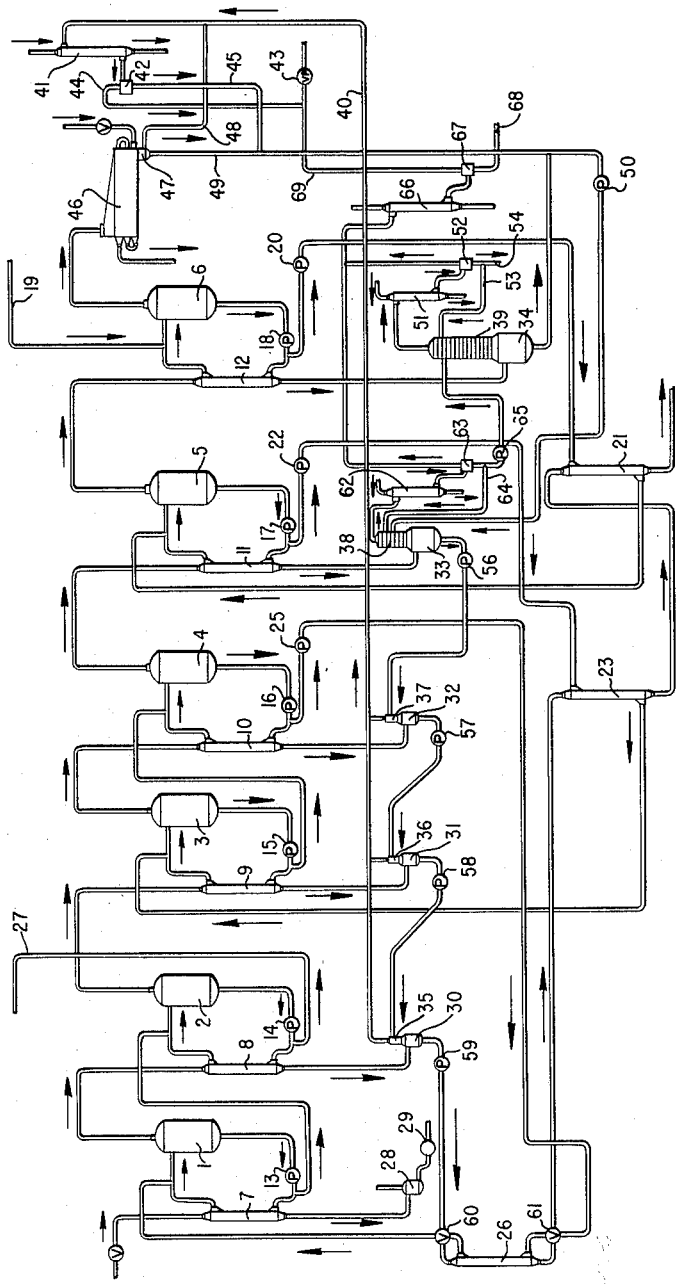
Figure 3:
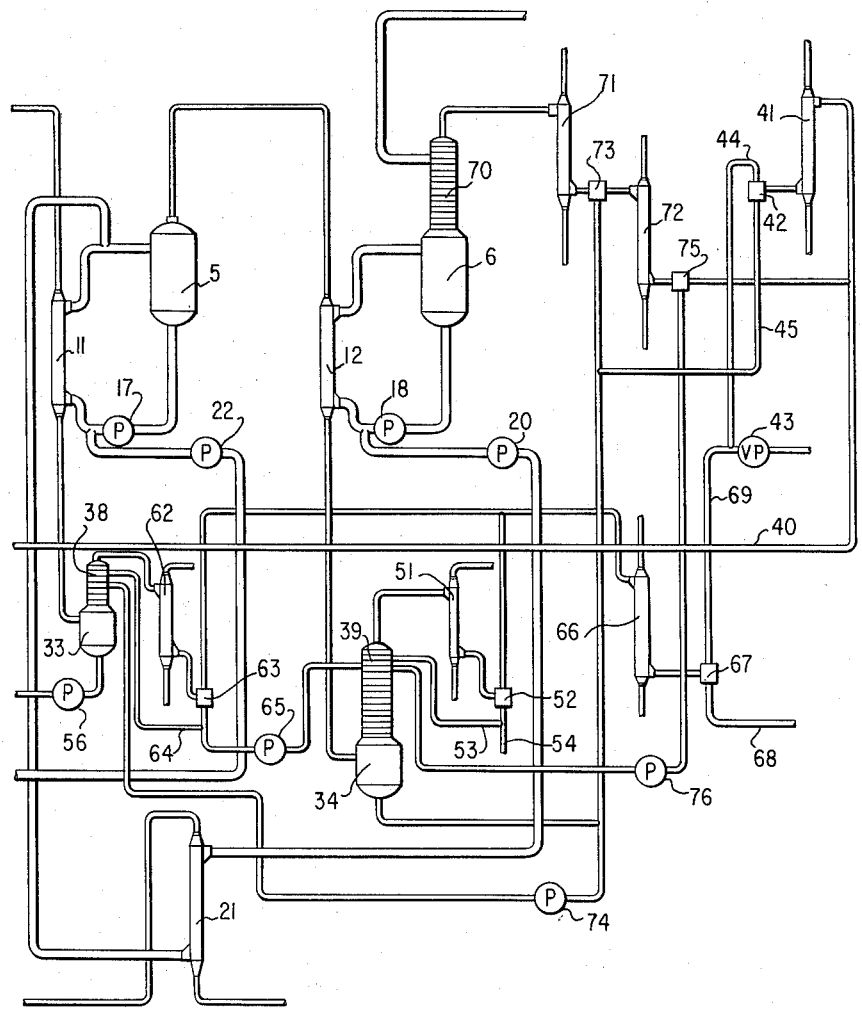

The invention will be explained more in detail below with reference to accompanying drawings, wherein FIGURES 1 and 2 show diagrammatically two embodiments of evaporating systems for carrying out the process while FIGURE 3 shows diagrammatically the last two evaporating stages of a third embodiment.

FIGURE 1 illustrates a six-stage system for evaporating fermented sulfite waste liquor with simultaneous recovery of the alcohol. The various stages are shown diagrammatically as comprising evaporators 1, 2, 3, 4, 5 and 6, respectively, and associated heaters 7, 8, 9, 10, 11 and 12, respectively, as well as circulating pumps 13, 14, 15, 16, 17 and 18, respectively by means of which the waste liquor being evaporated is caused to circulate through each evaporator and heater through conduits shown on the drawing.

The fermented liquor to be evaporated is introduced through the conduit 19 into the sixth evaporating stage wherein partial evaporation takes place, the main portion of the alcohol content being driven off simultaneously. Partly evaporated liquor is withdrawn and pumped by a pump 20 through a heat exchanger 21 wherein the liquor is preheated with condensate, as explained below, into the fifth evaporating stage, wherein continued evaporation and removal of the remaining alcohol take place. The liquor which is now practically free from alcohol is pumped by pump 22 through a heat exchanger 23 wherein the liquor is preheated by condensate, to the third evaporating stage. From this the liquor is passed to the fourth evaporating stage wherefrom it is pumped by pump 25 through a heat exchanger 26, wherein the liquor is preheated, to the first evaporating stage. Therefrom the liquor is passed to the second evaporating stage from which the finally evaporated liquor is withdrawn through conduit 27.

In the heater 7 of the first evaporating stage, steam is used as the heating medium. The condensate formed by said steam is collected in a condensate tank 28 and is returned by pump 29 to the boiler.

In the heaters 8, 9, 10, 11 and 12, the heating medium consists of the vapours driven off in the evaporating stage of next higher temperature. The condensates formed by these vapours are introduced together with uncondensed gases and vapor into separate condensate tanks 30, 31, 32, 33, 34 wherein the condensates are separated from the uncondensed gases and vapour. The three tanks 30, 31, 32, to which the condensates of the heaters 8, 9, 10 of the second, third and fourth evaporating stages are passed, are provided each with a scrubber unit 35, 36, 37, respectively, through which the separated uncondensed gases and pass in countercurrent to condensate taken from each succeeding stage whereby the gases and vapours heat said condensate and are partly condensed therein. Remaining uncondensed gases and vapour are introduced into a conduit 40 and are passed to a residual gas cooler 41, where further condensation takes place. The resulting condensate is separated from still uncondensed gases and vapours in a tank 42 wherefrom these gases and vapours are withdrawn through a conduit 44 by a vacuum pump 43, while the condensate leaves through a conduit 45.

The alcoholic vapours driven off in evaporator 6 are condensed in a surface condenser 46, and the resulting condensate is separated from uncondensed gases and vapour in a condensate tank 47 from which the gases and vapours are withdrawn through a conduit 48 communicating with the conduit 40, so that these gases and vapours enter the residual gas cooler 41 to recover any uncondensed alcohol therein, while the condensate is withdrawn through a conduit 49, to which the above mentioned condensate conduit 45 is connected, and is pumped by a pump 50 into a column 39 disposed on top of the condensate tank 34. As above mentioned, the condensate from the heater 12 of the sixth evaporating stage is introduced into the tank 34 together with uncondensed vapours and gases, the latter passing up through the column 2, whereby they meet the alcoholic condensate introduced by pump 50 and distil off the alcohol therefrom. The alcoholic vapours are condensed in a cooler 51, the resulting condensate is separated in the tank 52 from uncondensed gases and vapours, which flow to the conduit 40 and therefrom to the residual gas cooler 41 so that any alcohol vapour therein is recovered. A portion of the condensate passes from the tank 52 through conduit 53 to the column 39 to serve as reflux therein while the remainder is withdrawn as concentrated alcohol through conduit 54.

Condensate is passed from the tank 34 by pump 55 to a column 38 placed on top of the condensate tank 33, wherein it meets the uncondensed vapours and gases from tank 33 and is thus freed from any remaining alcohol which passes to the conduit 40. Thereupon the condensate is pumped by pumps 56, 57, 58 in series through the tanks 32, 31, 30 and their scrubber units 37, 36, 35. Thereupon the resulting heated condensate mixture is passed by pump 59 in series through the heat exchangers 26, 23 and 21 to preheat the liquor therein as mentioned above.

In connection with the heat exchanger 26 there are shown switching valves 60, 61 by which the sulfite waste liquor and the condensate in the heat exchanger can be caused to change sides in order to let the condensate dissolve incrustations deposited from the liquor on the heating surfaces. Such means can of course be provided also in connection with the heat exchangers 21 and 23, although they are not shown.

The six evaporators may operate, e.g., at 120° C., 93° C., 85° C., 75° C., 63° C. and 50° C., respectively. The liquor entering the system through conduit 19 usually has an alcohol content of approximately 1%. The vapours driven off in the evaporator 6 will then have an alcohol content of about 8%. In the column 39, the alcohol content may be built up so that the condensate withdrawn through conduit 54 obtains an alcohol content of about 95%. It is to be noted that the heat necessary to achieve this concentration is taken from the heat remaining in the uncondensed gases and vapours withdrawn from the heater 12, so that only inexpensive heat is consumer for the concentration of the alcohol.

It will further be noted that the major portion of the alcohol is driven off in the evaporator 6 and will thus be introduced into the column 39, while the greater portion of the remaining alcohol is driven off in evaporator 5 and will thus also be introduced into the column 39 through the heater 12 and condensate tank 34. Any remaining small quantities of alcohol are driven off in the other evaporating stages and will be recovered since uncondensed gases from all stages are introduced into the residual gas cooler 41 through the conduit 40.

The system illustrated in FIGURE 2 differs from that of FIGURE 1 with respect to the arrangement of the columns 38 and 39. In other respects this system closely resembles that of FIGURE 1 and will therefore be described only as regards those portions which are different. With respect to the portions which are similar in both figures, the same reference numerals will be used.

According to FIGURE 2, the alcoholic condensate formed in the surface condenser 46 and withdrawn through conduit 49 is fed by pump 50 to the top of column 38 (instead of column 39 as in FIGURE 1). The column 38 in this case is associated with a cooler 62 for condensing the vapours leaving the column and a condensate tank 63, from which a portion of the condensate is recycled through conduit 64 to the column 38 to serve as reflux, while the remainder of the condensate is introduced by pump 65 to the top of column 39. This column is arranged in the same manner as in FIGURE 1 and is thus equipped with a cooler 51, a condensate tank 52 and a reflux conduit 53. Concentrated alcohol is withdrawn through conduit 54. The condensate leaving the tank 34 is combined with the condensate in conduit 49, so that it will be introduced into column 38.

In this embodiment, the uncondensed gases and vapours separated from the liquid in the tanks 52 and 63 are not passed to the cooler 51, but to a separate cooler 66, aldehyde cooler, associated with a condensate tank 67 from which the condensate is discharged through conduit 68 while uncondensed gases and vapours flow out through a conduit 69 connected to the vacuum pump 43. This is made in order that aldehydes and other undesirable volatile substances driven off in the two columns shall not be returned into the concentrated alcohol.

Thus, it will be noted that in the system of FIGURE 2 the column 38 is used for treating the condensate having the greatest alcohol concentration. By way of example, in this column the alcohol content can be increased to about 35% in the condensate withdrawn from this column and passed to column 39. In column 39 the concentration will then be increased to about 95%.

FIGURE 3 illustrates a third embodiment. In this figure, only the two evaporation stages of the lowest temperatures are shown.

In the system of FIGURE 3 the evaporator 6 is provided with a column 70, into which the fresh liquor is introduced and in which it flows downwardly in countercurrent to the vapors driven off in the evaporator. Thereby, the distillation of the alcohol is made more efficient. Furthermore, the vapours leaving the column are subjected to fractional condensation in two coolers 71 and 72. The condensate formed in the cooler 71 and separated into the tank 73 from the remaining vapours before these flow into the cooler 72, has a lower alcohol content, e.g., 1.5%, and is introduced by pump 74 into the column 38 together with the condensate from the residual gas cooler 41 while the condensate formed in the cooler 72 and separated in tank 75 from remaining uncondensed gases and vapours has a higher alcohol content, e.g. about 16%, and is passed directly to the column 39 by pump 76. To this column is also passed the condensate of the alcoholic vapours driven off in column 38. In other respects, the embodiment of FIGURE 3 is similar to that of FIGURE 2.

It will be understood that the invention is not limited to the embodiments shown and described which are subject to many variations and modifications without departing from the spirit and scope of this invention.

I claim:

1. Method of evaporating an alcohol containing liquid with simultaneous recovery of the alcohol contained therein which comprises introducing said liquid into the lowest temperature stage of a multistage evaporating system having stages progressively increasing in temperature from said lowest temperature stage, each stage being heated by heat exchange with vapors from the next higher temperature stage wherein the major portion of the vapors is condensed whereby said condensed vapors still include uncondensed gases, recovering the major portion of said contained alcohol in the form of vapor from said lowest temperature stage, leaving a liquid containing a minor proportion of alcohol, condensing said alcohol vapor to obtain an alcoholic condensate, further concentrating said alcoholic condensate in a distillation column by the direct heat of said uncondensed gases from the evaporation stage of the system operating at a higher temperature than said lowest temperature stage, and further evaporating the liquid from the lowest temperature evaporation stage containing a minor proportion of alcohol in the stage operating at the next highest temperature to recover residual alcohol contained therein.

2. Method of evaporating an alcohol containing liquid with simultaneous recovery of the alcohol contained therein which comprises introducing said liquid into the lowest temperature stage of a multistage evaporating system having stages progressively increasing in temperature from said lowest temperature stage, each stage being heated by heat exchange with vapors from the next higher temperature stage wherein the major portion of the vapors is condensed whereby said condensed vapors still include uncondensed gases, recovering the major portion of said contained alcohol in the form of vapor from said lowest temperature stage, leaving a liquid containing a minor proportion of alcohol, condensing said alcohol vapor to obtain an alcoholic condensate, further concentrating said alcoholic condensate in a first distillation column wherein the alcohol is distilled by the direct heat of the uncondensed gases from the evaporation stage of the system operating at the second higher temperature than said lowest temperature stage, condensing the vapors from said first distillation column to obtain a second alcoholic condensate, concentrating said second alcoholic condensate in a second distillation column by the direct heat of the uncondensed gases from the stage next to said lowest temperature stage, and further evaporating the liquid from the lowest temperature evaporation stage containing a minor proportion of alcohol in the stage operating at the next highest temperature to recover residual alcohol contained therein.

3. Method of evaporating an alcohol containing liquid with simultaneous recovery of the alcohol contained therein which comprises introducing said liquid into the upper portion of a distillation column and thence into the lower temperature stage of a multistage evaporating system having stages progressively increasing in temperature from said lowest temperature stage, each stage being heated by heat exchange with vapors from the next higher temperature stage wherein the major portion of the vapors is condensed whereby said condensed vapors still include uncondensed gases, recovering the major portion of said contained alcohol in the form of vapor from said lowest temperature stage, said alcohol vapors passing through said column countercurrent to said incoming liquid, leaving a liquid containing a minor proportion of alcohol, condensing said alcohol vapor to obtain an alcoholic condensate, further concentrating said alcoholic condensate in a distillation column by the direct heat of said uncondensed gases from the evaporation stage of the system operating at a higher temperature than said lowest temperature stage, and further evaporating the liquid from the lowest temperature evaporation stage containing a minor proportion of alcohol in the stage operating at the next highest temperature to recover residual alcohol contained therein.

4. Method of evaporating an alcohol containing liquid with simultaneous recovery of the alcohol contained therein which comprises introducing said liquid into the lowest temperature stage of a multistage evaporating system having stages progressively increasing in temperature from said lowest temperature stage, each stage being heated by heat exchange with vapors from the next higher temperature stage wherein the major portion of the vapors is condensed whereby said condensed vapors still include uncondensed gases, recovering the major portion of said contained alcohol in the form of vapor from said lowest temperature stage, leaving a liquid containing a minor proportion of alcohol, condensing said alcohol vapor to obtain an alocholic condensate, further concentrating said alcoholic condensate in a first distillation column wherein the alcohol is distilled by the direct heat of the uncondensed gases from the evaporation stage of the system operating at the second higher temperature than said lowest temperature stage, condensing the vapors from said first distillation column to obtain a second alcoholic condensate, recycling a portion of said second alcoholic condensate to said first distillation column to serve as reflux, concentrating the remainder of said second alcoholic condensate in a second distillation column by the direct heat of the uncondensed gases from the stage next to said lowest temperature stage, and further evaporating the liquid from the lowest temperature evaporation stage containing a minor proportion of alcohol in the stage operating at the next highest temperature to recover residual alcohol contained therein.

5. Method of evaporating an alcohol containing liquid with simultaneous recovery of the alcohol contained therein which comprises introducing said liquid into the upper portion of a distillation column and thence into the lowest temperature stage of a multistage evaporating system having stages progressively increasing in temperature from said lowest temperature stage, each stage being heated by heat exchange with vapors from the next higher temperature stage wherein the major portion of the vapors is condensed whereby said condensed vapors still include uncondensed gases, recovering the major portion of said contained alcohol in the form of vapor from said lowest temperature stage, said alcohol vapors passing through said column countercurrent to said incoming liquid, leaving a liquid containing a minor proportion of alcohol, partially condensing said alcohol vapor to obtain a first alcoholic condensate, separating said condensate from the remaining alcohol vapors, further concentrating said first alcoholic condensate in a first distillation column by the direct heat of said uncondensed gases from the evaporation stage of the system operating at a higher temperature than said lowest temperature stage, condensing said remaining alcohol vapors to obtain a second alcoholic condensate, further concentrating said second alcoholic condensate in a second distillation column together with the concentrated condensate from said first distillation column and further evaporating the liquid from the lowest temperature evaporation stage containing a minor proportion of alcohol in the stage operating at the next highest temperature to recover residual alcohol contained therein.

References Cited in the file of this patent

UNITED STATES PATENTS

| | | |
|---|---|---|
| 1,715,313 | Suida | May 28, 1929 |
| 2,126,974 | Reich | Aug. 16, 1938 |
| 2,127,138 | Reich | Aug. 16, 1938 |
| 2,733,195 | Miller | Jan. 31, 1956 |
| 2,880,091 | Neureuther | Mar. 31, 1959 |